United States Patent [19]

Kobayashi et al.

[11] Patent Number: 4,986,144
[45] Date of Patent: Jan. 22, 1991

[54] MULTI-PLANE SETTING TYPE REDUCTION GEAR DRIVE STRUCTURE

[75] Inventors: Toru Kobayashi; Tsunetoshi Sonohara, both of Nagoya, Japan

[73] Assignee: Mitsubishi Jukogyo Kabushiki Kaisha, Tokyo, Japan

[21] Appl. No.: 350,031

[22] Filed: May 10, 1989

[30] Foreign Application Priority Data

Jul. 29, 1988 [JP] Japan .............................. 63-99936[U]

[51] Int. Cl.⁵ ............................................. F16H 57/02
[52] U.S. Cl. .................................................... 74/606 R
[58] Field of Search ................... 74/606 R, 606 A, 607

[56] References Cited

U.S. PATENT DOCUMENTS

| 1,462,675 | 7/1923 | Whittington | 74/606 R |
|---|---|---|---|
| 2,734,393 | 2/1956 | Luenberger | 74/606 R |
| 3,521,504 | 7/1970 | Jorg | 74/606 R |
| 3,992,956 | 11/1976 | Fischer | 74/606 R X |
| 4,020,715 | 5/1977 | Sollars | 74/606 R |
| 4,333,358 | 6/1982 | Grattapaglia | 74/606 R X |
| 4,344,501 | 8/1982 | Jerry et al. | 74/606 R X |
| 4,708,027 | 11/1987 | Stenner | 74/606 R |
| 4,791,831 | 12/1988 | Behnke et al. | 74/606 R |

FOREIGN PATENT DOCUMENTS

| 818716 | 9/1951 | Fed. Rep. of Germany | 74/606 R |
|---|---|---|---|
| 1030131 | 5/1958 | Fed. Rep. of Germany | 74/606 R |
| 1032635 | 6/1958 | Fed. Rep. of Germany | 74/606 R |
| 7725565 | 11/1977 | Fed. Rep. of Germany | 74/606 R |
| 2745607 | 4/1979 | Fed. Rep. of Germany | 74/606 R |
| 1276339 | 10/1961 | France | 74/606 R |
| 1568649 | 4/1969 | France | 74/606 R |
| 2547007 | 6/1983 | France | 74/606 R |
| 501432 | 11/1954 | Italy | 74/606 |

OTHER PUBLICATIONS

D. O. James Gear Manufacturing Co., Catalog 45-F Type "S" Worm Gear Speed Reducers, May 19, 1954.
"New Concept in Worm Reduction Gear Units", Engineers' Digest, 46 (1985), Jan., No. 1.

Primary Examiner—Vinh T. Luong
Attorney, Agent, or Firm—Wenderoth, Lind & Ponack

[57] ABSTRACT

A housing of reduction gears adapted to be directly coupled to a motor is improved in order to make it possible for a drive shaft of the reduction gears to assume various positions and attitudes. The improvements reside in that the housing has a hexahedral shape, and setting holes are provided on the respective planar surfaces of the housing except for that surface through which the housing of the reduction gears is directly coupled to the motor. Preferably, bolt pockets are provided on two opposed supporting planar surfaces, and bolt holes extend to the respective bolt pockets from a supporting planar surface adjacent to the two opposed supporting planar surfaces.

2 Claims, 2 Drawing Sheets

FIG. 3(a)
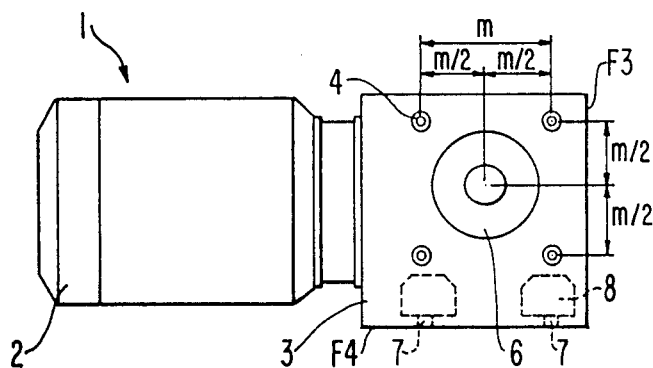
FIG. 3(b)
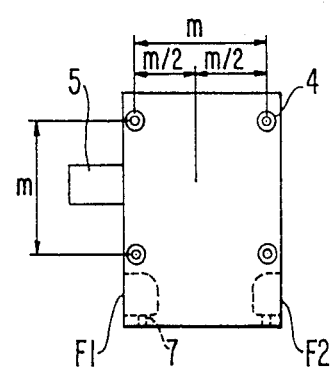
FIG. 3(c)
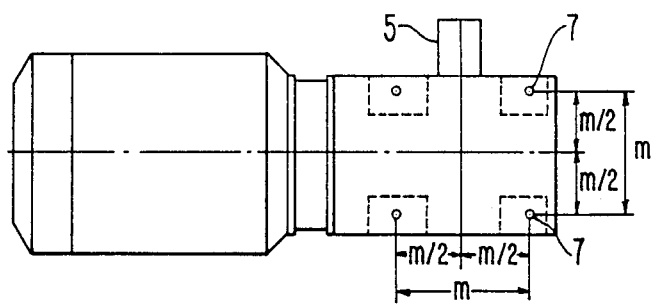
FIG. 4(a)
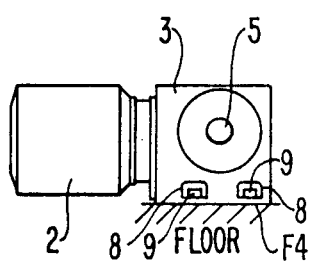
FIG. 4(b)
FIG. 4(c)
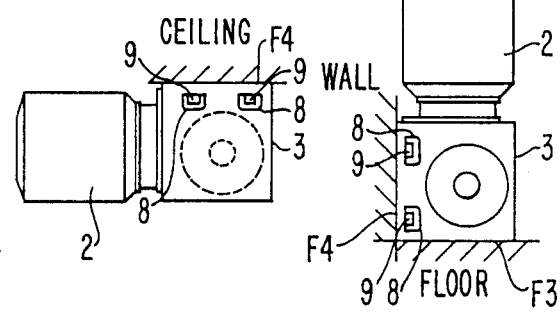
FIG. 4(d)
FIG. 4(e)
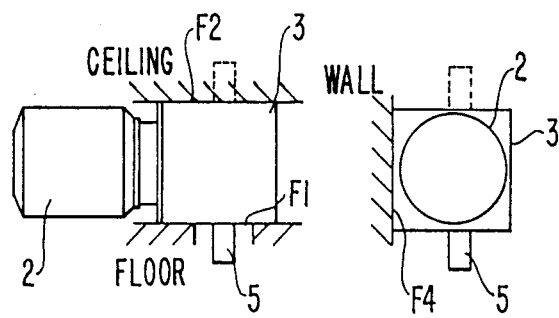

MULTI-PLANE SETTING TYPE REDUCTION GEAR DRIVE STRUCTURE

BACKGROUND OF THE INVENTION

1. Field of the Invention

The present invention relates to the housing of motor-direct-coupled reduction gears such as worm reduction gears or the like.

2. Description of the Prior Art

Heretofore, in worm reduction gears of the type in which a motor and reduction gears are integrally assembled, only one planar supporting surface of a housing accommodating the reduction gears, and on which surface the housing could be set, was, in most cases, provided. Furthermore, even if it is attempted to make the configuration of the housing as compact as possible by reducing an amount of offset between an output shaft of a motor and a drive shaft projecting from the housing, the number of possible supporting surfaces is at most two. Therefore, in order to enable a drive shaft of reduction gears to assume a variety of positions and attitudes when fixed to various flat surfaces of a support, many kinds of housings designed exclusively to be mounted to certain ones of such support surfaces were still necessitated.

As described above, in the prior art since many kinds of housings designed for exclusive use were necessitated to accommodate for various possible setting attitudes required, a manufacturing cost as well as an expense for the maintenance and control associated therewith were relatively high. In addition, since housings adapted for exclusive use at certain setting attitudes were employed, sizes and positional dimensions of screw holes or bolt holes for facilitating the mounting of the housing were different, many kinds of parts associated with such mounting were required, and hence user costs were high.

SUMMARY OF THE INVENTION

It is therefore one object of the present invention to provide an improved housing of reduction gears adapted to be directly coupled to a motor, which housing can be mounted at various positions and attitudes via a plurality of planar supporting surfaces thereof.

According to one feature of the present invention, there is provided a housing of multi-plane setting type reduction gears adapted to be directly coupled to a motor and which housing has a hexahedral shape. Setting holes are provided on the respective planar surfaces of the housing except for a motor supporting planar surface at which the housing is coupled to the motor.

According to another feature of the present invention, in the above-described multi-plane setting type reduction gears, bolt pockets are provided on two opposed planar supporting surfaces, and bolt holes extending and open to the respective bolt pockets are provided on one planar supporting surface extending between the two opposed supporting planar surfaces.

In other words, the inventive concept of the present invention resides in the following points:

(1) A housing of reduction gears has a shape defined by four to five planar surfaces which can be utilized as supporting surfaces.

(2) Sizes and machines positions of the setting screw holes, i.e. the pattern and relative spacing in which the holes are arrayed, on the respective supporting planar surfaces are all the same.

(3) In order to facilitate the mounting of the housing to support structure, the housing is formed such that members other than a drive shaft do not project from the respective supporting surfaces.

According to the present invention, since a housing of reduction gears is provided with a plurality of supporting surfaces and the patterns in which the setting screw holes are arrayed on the respective supporting surfaces are the same, planar surfaces of the housing of reduction gears can be respectively set against a wall, a floor or the like.

The above-mentioned and other objects, features and advantages of the present invention will become more apparent by referring to the following description of preferred embodiments of the invention taken in conjunction with the accompanying drawings.

BRIEF DESCRIPTION OF THE DRAWINGS

In the accompanying drawings:

FIG. 3 shows a second preferred embodiment of the present invention, FIG. 3(a) being a front view, FIG. 3(b) being a right side view FIG. 3(c) being a bottom view; and FIGS. 4(a) to 4(e) are schematic views showing different attitudes at which the apparatus shown in FIG. 3 may be set.

DETAILED DESCRIPTION OF THE PREFERRED EMBODIMENTS

Figure 1A:
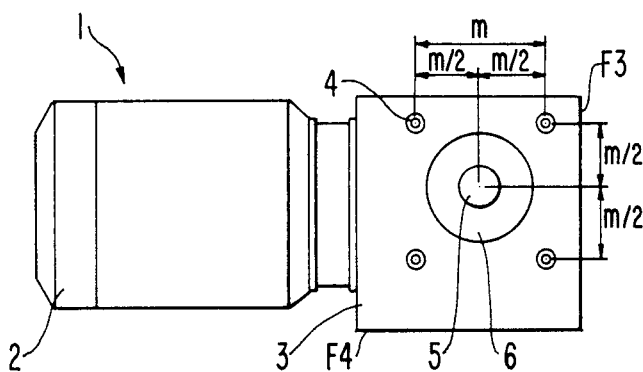
FIG. 1 shows a first preferred embodiment of the present invention, FIG. 1(a) being a front view, FIG. 1(b) being a right side view, and FIG. 1(c) being a bottom view.
Figure 1B:
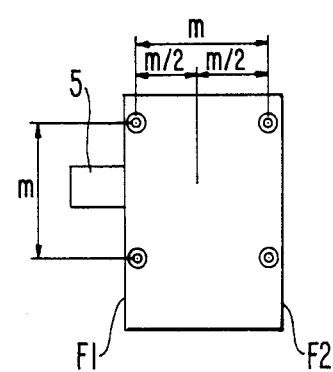
Figure 1C:
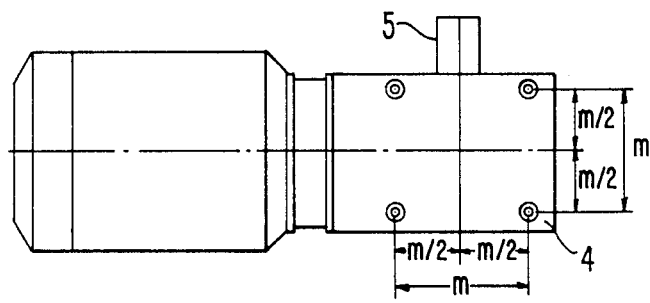

Now a first preferred embodiment of the present invention will be described with reference to FIGS. 1 and 2. In these figures, reference numeral 1 designates worm reduction gears and a housing thereof, such housing being directly coupled to a motor 2. A housing 3 accommodates reduction gear mechanisms (not shown) and has a rectangular parallelepipedal shape defined by six planar surfaces. One planar surface, hereinafter referred to as a motor supporting planar surface, is exclusively used for securement of the motor 2, and among the remaining five planar surfaces, four (F1-F4) are available as supporting surfaces on which the housing 3 can be set.

Projecting longitudinally from one planar surface F1 of the above-mentioned four planar surfaces available as supporting surfaces of the housing 3 having a regular parallelepipedal shape, is a drive shaft 5 extending perpendicular to the center axis of the motor 2 (that is, to the direction along which the motor 2 is connected to the housing 3).

On each of the planar supporting surfaces F1–F4 are provided four setting screw holes 4. And, the sizes of the mounting screw holes on these supporting planar surfaces, the interval m (relative spacing) between the setting screw holes and the array thereof are all common to the respective planar supporting surfaces F1–F4.

On both the above-mentioned planar supporting surface F1 and the planar supporting surface F2 opposed thereto, are disposed four setting screw holes 4 at the respective apexes of a square having the above-mentioned drive shaft 5 disposed at its center, having respective sides extending parallel to the side edges of the respective planar surfaces F1 and F2, and having side lengths m. Also, on both of the other planar supporting surfaces F3 and F4 are disposed four setting screw holes 4 at the respective apexes of a square having the center axis of the motor 2 disposed at its center, having respective sides extending parallel to the side edges of the respective planar surfaces F3 and F4, and having side lengths m. Thus, the plurality of setting screw holes 4 are arrayed in the same pattern and relative spacing in each of the planar supporting surfaces F1-F4.

In these figures, reference numeral 6 designates side covers mounted on the planar supporting surfaces F1 and F2, respectively. In the side cover 6 on the planar supporting surface F1 is formed a hole through which the drive shaft 5 extends, while there is no such through hole in the side cover 6 on the planar supporting surface F2 from which the drive shaft 5 does not project. The aforementioned side covers 6 are designed so as not to project from the respective planar supporting surfaces F1 and F2.

The reduction gears according to the illustrated embodiment can have the housing 3 thereof set on a floor, a ceiling, a wall or like support at various attitudes via any one of the planar supporting surfaces F1-F4 by the intermediary of screws threadedly mated with the above-mentioned setting screw holes 4.

Figure 2A:
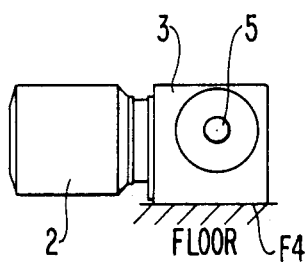
FIGS. 2(a) to 2(e) are schematic views showing different attitudes at which the apparatus shown in FIG. 1 may be set.
Figure 2B:
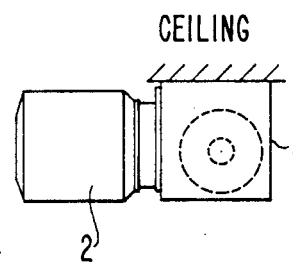
Figure 2C:
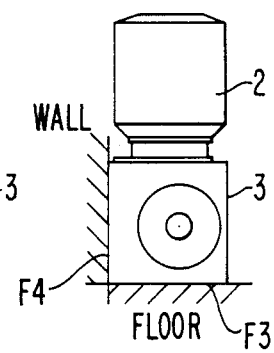
Figure 2D:
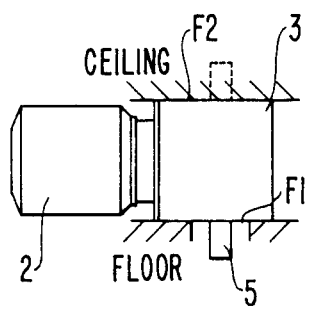
Figure 2E:
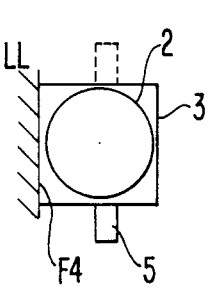

FIG. 2 shows a variety of ways in which the planar surfaces F1-F4 may support the housing 3 mounted to a support, the housing 3 of the reduction gears being mounted to a floor as shown in FIG. 2(a), the housing 3 of the reduction gears being mounted to a ceiling as shown in FIG. 2(b), the housing of the reduction gears being mounted to a wall or a floor as shown in FIG. 2(c), the housing 3 of the reduction gears being mounted to a ceiling or a floor as shown in FIG. 2(d), and the housing 3 of the reduction gears being mounted to a wall as shown in FIG. 2(e).

It is to be noted that while the drive shaft 5 projects from the planar supporting surface F1 in the illustrated first embodiment, it is also possible to provide drive shafts which project from both planar supporting surfaces F1 and F2 or to provide a drive shaft projecting from either planar supporting surface F1 or F2. In FIGS. 2(d) and 2(e), the embodiment in which the drive shaft projects from the planar supporting surface F2 is illustrated by dotted lines.

Next, a second preferred embodiment of the present invention is shown in FIGS. 3 and 4. In these figures, reference numeral 1 designates worm reduction gears and a housing thereof, such housing being directly coupled to a motor 2. A housing 3 accommodates reduction gear mechanisms (not shown) and has a rectangular parallelepipedal shape defined by six planar surfaces. One planar surface is exclusively used as the motor planar supporting surface for securement of the motor 2, and among the remaining five planar surfaces, four (F1-F4) are available as supporting surfaces on which the housing 3 can be set.

The structure of the housing 3 according to this preferred embodiment is similar to that in the above-described first preferred embodiment except for the following points.

In this preferred embodiment, since it is intended that one of the planar supporting surfaces (F4) will be used most frequently, two bolt pockets 8 are provided in two of the planar supporting surfaces (F1 and F2), respectively. And, in the planar supporting surface F4 are defined threaded holes 7 for receiving bolts 9 which extend into the bolt pockets 8, so that fastening of bolts 9 inserted into these threaded holes 7 can be performed from the sides of the housing. It is to be noted that in the planar supporting surfaces F1-F3 are defined setting screw holes 4 similar to those of the first preferred embodiment, and that the positions and array of the threaded holes 7 in the planar supporting surface F4 are similar to those of the setting screw holes 4 in the planar supporting surface F4 in the first preferred embodiment, i.e. the setting screw holes 4 and the threaded holes 7 are arrayed in the same pattern and relative spacing in their respective planar supporting surfaces.

According to the second preferred embodiment, the housing 3 can be supported on a floor, a ceiling, a wall or like support via the planar supporting surface F1, F2 or F3 and mounted thereto by the intermediary of setting screws similarly to the first preferred embodiment. However, since the housing 3 is to be set most frequently on the planar supporting surface F4, the bolts 9 can be easily fastened from the sides of the housing by making use of the bolt pockets 8 provided in the planar supporting surfaces F1 and F2.

FIG. 4 shows a variety of ways in which the planar surfaces F1-F4 may support the housing 3 mounted to a support surface, the housing 3 of the reduction gears being mounted to a floor as shown in FIG. 4(a), the housing 3 of the reduction gears being mounted to a ceiling as shown in FIG. 4(b), the housing of the reduction gears being mounted to a wall or a floor as shown in FIG. 4(c), the housing 3 of the reduction gears being mounted to a ceiling or a floor as shown in FIG. 4(d), and the housing 3 of the reduction gears being mounted to a wall as shown in FIG. 4(e).

It is to be noted that while a housing having a rectangular parallelepipedal shape was employed in the above-described first and second preferred embodiments, depending upon the structure of the floor, ceiling and wall on which the housing of the reduction gears is to be mounted, a hexahedral shape other than a rectangular parallelepipedal shape can be employed. Furthermore, a modification could be made such that the housing could be mounted on a base plate via setting screws or bolts and the base plate could be fixedly secured to a floor, a ceiling or a wall, without the housing itself being directly mounted to a floor, a ceiling or a wall.

As will be apparent from the detailed description of the preferred embodiments of the present invention above, the following advantages are obtained due to the fact that a housing accommodating reduction gears directly coupled to a motor has a hexahedral shape and setting holes are provided on the respective planar surfaces of the housing which respective planar surfaces are not directly coupled to the housing of the motor:

(1) Only one kind of housing can be adapted to be set at various modes, and so, a manufacturing cost associated with producing housings to meet various demands is relatively inexpensive.

(2) Users may make common use of a setting bracket, and hence the improved reduction gears according to the present invention can contribute to a rationalization in the aspects of design and manufacture (especially in the case of disposing a plurality of reduction gears at different attitudes).

(3) In a plant or the like, often reduction gears are used as disposed at various attitudes, and in such cases with the reduction gears according to the present invention, one kind of reduction gear can meet such various setting requirements.

While a principle of the present invention has been described above in connection with preferred embodiments of the invention, it is intended that all matter contained in the description and illustrated in the accompanying drawings shall be interpreted to be illustrative and not limitative of the invention.

What is claimed is:

1. A reduction gear drive structure comprising a housing for reduction gears, said housing having a shape defined by a motor supporting planar surface and an additional four planar supporting surfaces; a reduction gear drive shaft projecting longitudinally from said housing through one of said four planar supporting surfaces; a motor mounted to said housing at said motor supporting planar surface of said housing; and each of said four planar supporting surfaces defining a plurality of holes therein for receiving threaded fasteners to secure the housing to a support, the plurality of holes being arrayed in the same pattern and relative spacing in each of said four planar supporting surfaces, said pattern in which said plurality of holes are arrayed in each of said four planar supporting surfaces respectively having a center through which an axis passing perpendicular to the respective one of said four planar supporting surfaces intersects the longitudinal axis of said drive shaft, two of said four planar supporting surfaces of said housing defining pockets therein, one of said four planar supporting surfaces, extending between said two of said four planar supporting surfaces, and the holes defined in said one of said four planar supporting surfaces extending and being open to said pockets.

2. A reduction gear drive structure comprising a housing for reduction gears, said housing having a shape defined by a motor supporting planar surface and an additional four planar supporting surfaces; a reduction gear drive shaft projecting longitudinally from said housing through one of said four planar supporting surfaces; and of said motor supporting planar surface and said four planar supporting surfaces, only each of said four planar supporting surfaces defining a plurality of holes therein for receiving threaded fasteners to secure the housing to a support, the plurality of holes being arrayed in the same pattern and relative spacing in each of said four planar supporting surfaces, said pattern in which said plurality of holes are arrayed in each of said four planar supporting surfaces respectively having a center through which an axis passing perpendicular to the respective one of said four planar supporting surfaces intersects the longitudinal axis of said drive shaft, two of said four planar supporting surfaces of said housing defining pockets therein, one of said four planar supporting surfaces extending between said two of said four planar supporting surfaces, and the holes defined in said one of said four planar supporting surfaces extending and being open to said pockets.

* * * * *